(12) United States Patent
Arimura

(10) Patent No.: US 8,278,003 B2
(45) Date of Patent: Oct. 2, 2012

(54) DIRECT METHANOL FUEL CELL

(75) Inventor: Tomoaki Arimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/085,245

(22) Filed: Apr. 12, 2011

(65) Prior Publication Data

US 2011/0294034 A1    Dec. 1, 2011

(30) Foreign Application Priority Data

May 26, 2010    (JP) ................................. 2010-120882

(51) Int. Cl.
    *H01M 8/04*    (2006.01)
(52) U.S. Cl. ....................................... 429/481; 429/506
(58) Field of Classification Search ........................ None
    See application file for complete search history.

(56) References Cited

U.S. PATENT DOCUMENTS

| 2004/0265536 A1 | 12/2004 | Sana et al. |
| 2011/0123895 A1 | 5/2011 | Arimura |

FOREIGN PATENT DOCUMENTS

| JP | 2004-351882 | 12/2004 |
| JP | 2005-116180 | 4/2005 |
| JP | 2006-164642 | 6/2006 |
| JP | 2006-164643 | 6/2006 |
| JP | 2007-250411 | 9/2007 |
| JP | 2009-140670 | 6/2009 |
| JP | 2011-113740 | 6/2011 |

OTHER PUBLICATIONS

Japanese Patent Application No. 2010-120882; Notice of Reasons for Rejection; Mailed Aug. 2, 2011 (English translation).

*Primary Examiner* — Robert Hodge
(74) *Attorney, Agent, or Firm* — Blakely Sokoloff Taylor & Zafman, LLP

(57) ABSTRACT

According to one embodiment, a direct methanol fuel cell includes an anode to which an aqueous methanol solution is supplied as the fuel, a cathode to which oxidizing gas is supplied, an electrolyte membrane interposed between the anode and the cathode, a first separator disposed on the surface of the anode on the side opposite to the electrolyte membrane side and a second separator disposed on the surface of the cathode on the side opposite to the electrolyte membrane side, wherein the first and second separators are respectively made of a membrane containing a copolymer of a first vinyl monomer having a cyclic functional group bonded with a carbonyl group, a second vinyl monomer having a carboxyl group and a third vinyl monomer having an aromatic group, and a carbon powder dispersed in the copolymer.

4 Claims, 1 Drawing Sheet

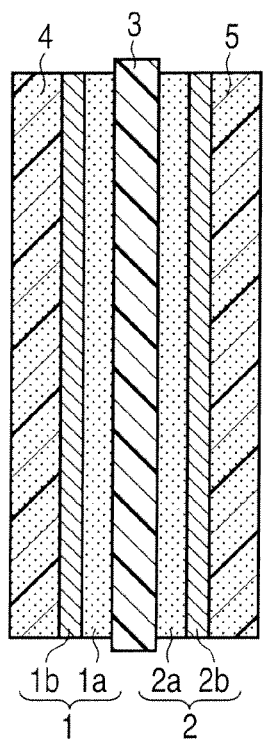
F I G. 1
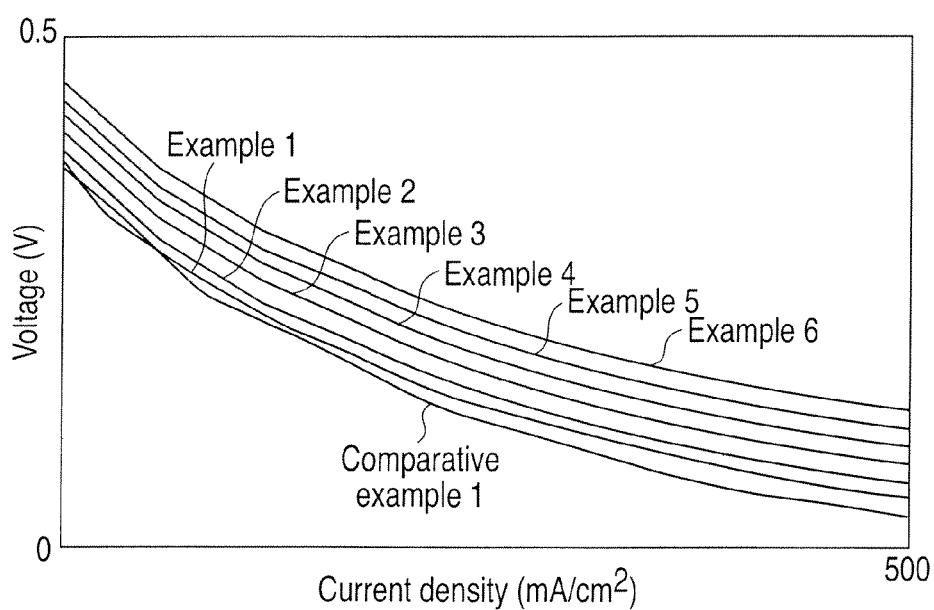
F I G. 2

DIRECT METHANOL FUEL CELL

CROSS-REFERENCE TO RELATED APPLICATIONS

This application is based upon and claims the benefit of priority from Japanese Patent Application No. 2010-120882, filed May 26, 2010; the entire contents of which are incorporated herein by reference.

FIELD

Embodiments described herein relate generally to a direct methanol fuel cell.

BACKGROUND

A direct methanol fuel cell is provided with an anode to which an aqueous methanol solution is supplied as the fuel, a cathode to which oxidizing gas is supplied, an electrolyte membrane interposed between these electrodes, a fuel separator which is disposed in the anode and has a fuel passage and a cathode separator which is disposed in the cathode and has an oxidizing gas passage. The separator is conventionally used a carbon plate or SUS plate and formed with a passage several millimeters deep by cutting or pressing.

However, it is difficult to decrease the thickness of each separator because a passage several millimeters deep is formed on the separator. As a result, a fuel cell provided with this separator is increased in whole thickness, causing an increase in weight, resulting in low output density.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a sectional view showing a direct methanol fuel cell according to an embodiment.

FIG. 2 is a view showing a current-voltage curve of each evaluation unit cell obtained in Examples 1 to 6 and Comparative Example 1 at 50° C.

DETAILED DESCRIPTION

Various embodiments will be described hereinafter with reference to the accompanying drawings.

In general, according to one embodiment, a direct methanol fuel cell comprises an anode to which an aqueous methanol solution is supplied as the fuel, a cathode to which oxidizing gas is supplied, an electrolyte membrane interposed between the anode and the cathode, a first separator disposed on the surface of the anode on the side opposite to the electrolyte membrane side and a second separator disposed on the surface of the cathode on the side opposite to the electrolyte membrane side, wherein the first and second separators are respectively made of a membrane containing a copolymer of a first vinyl monomer having a cyclic functional group bonded with a carbonyl group, a second vinyl monomer having a carboxyl group and a third vinyl monomer having an aromatic group, and a carbon powder dispersed in the copolymer.

In an embodiment, a direct methanol fuel cell has the structure shown in FIG. 1.

In FIG. 1, an anode 1 faces to a cathode 2. An aqueous methanol solution is supplied to the anode as the fuel. Oxidizing gas is supplied to the cathode. An electrolyte membrane 3 is interposed between the anode 1 and cathode 2. The anode 1 comprises a catalyst layer 1a which is in contact with the electrolyte membrane 3 and a diffusion layer 1b which is stacked on the catalyst layer 1a and made of a material such as carbon paper. The cathode 2 comprises a catalyst layer 2a which is in contact with the electrolyte membrane 3 and a diffusion layer 2b which is laminated on the catalyst layer 2a and made of a material such as carbon paper.

The first separator 4 is disposed on the surface of the anode 1 on the side opposite to the electrolyte membrane 3. The first separator 4 is a membrane comprising the aforementioned copolymer and a carbon powder dispersed in this copolymer and has a membrane structure with fine passages formed therein. This poses the problem of leakage of fuel flowing through a passage formed in the first separator itself from surfaces other than the surface which is in contact with the surface of the anode 1, that is, from the surface opposite to the surface which is in contact with the anode and from the side surfaces along the direction of the thickness. In a preferred embodiment of the first separator 4, the ends of passages (openings of the passages) of the surfaces other than the surface which is in contact with the surface of the anode 1 are sealed by hot pressing to prevent leakage of fuel.

The second separator 5 is disposed on the surface of the cathode 2 on the side opposite to the electrolyte membrane 3 side. Similarly to the above described first separator 4, the second separator 5 is provided with a membrane structure in which fine passages are formed. For this, the ends of passages (openings of the passages) of the surfaces other than the surface which is in contact with the surface of the cathode 2 are sealed by hot pressing to prevent leakage of oxidizing gas.

The first separator 4, anode 1, electrolyte membrane 3, cathode 2 and second separator 5 are secured to each other by bolts and nuts (not shown).

In a preferred embodiment, the first and second separators are respectively a membrane containing a copolymer represented by the following formula (I) and a carbon powder dispersed in the copolymer.

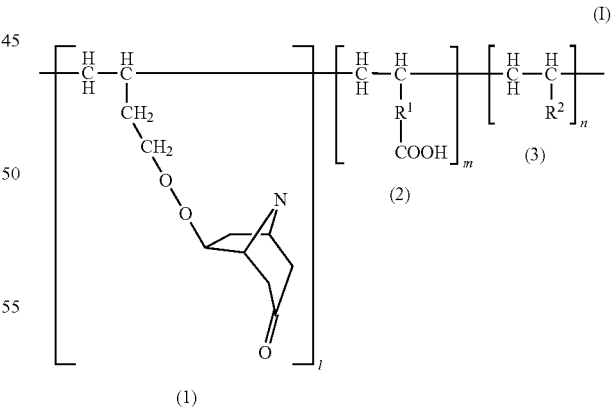

In the formula (I), $R^1$ represents an alkyl group having 1 to 20 carbon atoms, $R^2$ represents an aromatic group, l, m and n denote the degrees of polymerization of the first, second and third monomers (1), (2) and (3), respectively: $l=10\text{-}300$, $m=100\text{-}700$ and $n=20\text{-}250$.

The alkyl group which is $R^1$ in the formula (I) is preferably a linear alkyl group.

The aromatic group which is $R^2$ in the formula (I) preferably has the following structural formula (A):

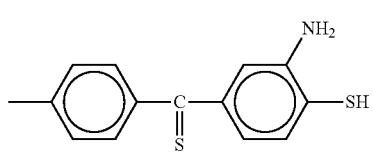

In the formula (I), l, m and n are preferably as follows: l=50-250, m=150-600 and n=50-200.

In a preferred embodiment, the average particle diameter of the carbon powder is 3 to 300 μm, preferably 20 to 100 μm.

In a preferred embodiment, the proportions of the copolymer and carbon powder in each of the first and second separators are 2 to 40% by weight and 1 to 30% by weight, preferably 5 to 15% by weight and 4 to 12% by weight, respectively.

In a preferred embodiment, the first and second separators may further contain electrolyte materials. Examples of the electrolyte materials include a perfluoroalkylsulfonic acid polymer.

According to the embodiment explained above, the first and second separators are respectively made of a membrane containing a copolymer of a first vinyl monomer having a cyclic functional group bonded with a carbonyl group, a second vinyl monomer having a carboxyl group and a third vinyl monomer having an aromatic group, and a carbon powder dispersed in the copolymer, thereby making it possible to form fine passages in the membrane itself.

Specifically, in the first and second separators, several cyclic functional groups of the first vinyl monomer are combined to form many rings with voids in the membrane and these rings are connected with each other such that these voids are communicated with each other, to form passages. In other words, the first and second separators have the above membrane structure, respectively, thereby forming fine passages. As a result, methanol flows through the above passage in the first separator (anode side) and is supplied to the anode in the form of $H^+$ at the boundary with the anode. In the second separator (cathode side), oxygen flows through the above passage and is supplied to the cathode in the form of $O^-$ at the boundary with the cathode.

Also, the carboxyl group of the second vinyl monomer in the copolymer raises the conductivity of a proton ($H^+$) in the first separator (anode side).

Moreover, the aromatic group of the third vinyl monomer in the copolymer improves the heat resistance of each separator.

The first and second separators containing the copolymer represented by the above formula (I) can form the passage having the above structure more stably.

As mentioned above, the first and second separators of the fuel cell according to the embodiment are made without cutting processing or press processing and have the membrane structure allowing the formation of fine passages having a size of micron order. Therefore, unlike conventional separators, it is unnecessary to form passages several millimeters in depth by cutting processing or press processing. For this, the first and second separators can be reduced in thickness more significantly than conventional separators. For example, the conventional separators provided with passages formed by cutting or pressing each have a thickness of about 4 mm whereas the first and second separators used in this embodiment can be reduced in thickness to as low as 100 to 300 μm. As a result, in, for example, a fuel cell having a stack structure, the whole thickness can be reduced, enabling a reduction in weight, and therefore, the output density can be increased.

Also, the conventional separator provided with passages formed by cutting processing or press processing cannot be free of the occurrence of the liquid droplet-clogging (flooding) phenomenon in the passages. In contrast to this, the first and second separators of the fuel cell according to this embodiment are reduced in the flooding phenomenon and therefore, improved in reliability because the membrane structure of each of these separators allow the formation of fine passages.

The present invention will now be explained in detail by way of examples. The "parts" in these examples are "parts by weight".

Example 1

Preparation of a Hydro-Gel

A round bottomed reaction container equipped with an overhead stirrer and a Dimroth condenser was charged with 30 parts of dry tetrahydrofuran. Then, 100 parts of vinyltropinone acetate ester and 122 parts of vinyl acetate ($R^1$=$CH_2$ in the above formula [I]) were added from above the reaction container and 2 parts of styrene-(3-amino-4-thiol)thioketone and 1 part of azobisbutyronitrile were further added. The mixture was stirred at ambient temperature for one hour and the resulting precipitate subjected to suction filtration using a glass filter G3 to obtain a hydro-gel.

[Production of First and Second Separators]

Next, 5 parts of a carbon powder having an average particle diameter of 3 μm was added, and 20 parts of dimethylformamide ware further added, to the 30 parts of obtained hydrogel. The mixture was stirred by a homogenizer to produce a viscous raw material for a separator. The resulting raw material was cast and dried, thereby producing a first separator having 200 μm in thickness.

A second separator having 200 μm in thickness was produced in the same manner.

[Production of an Anode]

Next, 20 parts of a carbon powder carrying ruthenium platinate and 80 parts of a 5% perfluoroalkylsulfonic acid polymer (trademark: Nafion, manufactured by Du Pont) solution were mixed and suspended to produce a slurry. The obtained slurry was applied to carbon paper (trademark: TPG-H-120, manufactured by Toray Industries Inc.) by using a coater such that the amount of ruthenium platinate to be carried was 2 mg/cm$^2$ to form a catalyst layer, thereby producing an anode having a total thickness of 100 μm.

[Production of a Cathode]

Next, 100 parts of an aqueous 1% chloroplatinic acid solution was added to 10 parts of Ketjen Black and the mixture was stirred. When the viscosity of the whole solution was increased, 100 parts of an aqueous 5% hydrazine solution was added to the mixture, which was then stirred to make the carbon powder carry platinum. Then 30 parts of the obtained catalyst powder and 100 parts of a 5% perfluoroalkylsulfonic acid polymer (trademark: Nafion, manufactured by Du Pont) were mixed and stirred. When the viscosity of the solution was increased, the resulting solution was applied to carbon paper such that the amount of the catalyst to be carried was 1 mg/cm$^2$ to form a catalyst layer, thereby forming a cathode having a total thickness of 100 μm.

[Production of a Membrane Electrode]

The obtained anode and cathode were arranged such that their catalyst layers were disposed opposite to each other and a polymer electrolyte membrane (trade name: Nafion 117, manufactured by Du Pont) having 150 μm in a thickness was interposed between these electrodes. After that, the stacked structure was treated by hot-pressing to produce a membrane electrode having an electrode area of 5 cm$^2$.

[Production of a Unit Cell]

The obtained membrane electrode was sandwiched between the above first separator and second separator, which were then fastened with bolts to fabricate an evaluation unit cell having a total thickness of 750 μm. In this case, prior to the fastening with bolts, the first and second separators were placed in a rectangular dished hot plate and heat-treated at 80° C. for one minute to seal the ends of passages (openings of the passages) positioned on the surface opposite to the surface which was in contact with the membrane electrode and on the side surfaces opposite to each other along the longitudinal direction. The ends of passages (openings of the passages) of each separator on the side surfaces opposite to each other along the direction of the short side were untreated and functioned as the intake ports and discharge ports for an aqueous methanol solution and as the intake ports and discharge ports for oxidizing gas.

Example 2

A hydro-gel was obtained in the same manner as in Example 1 except that a vinylcarboxylic acid represented by the above formula (I) in which $R^1=CH_2CH_2$ was used in place of the above vinyl acetate. The obtained hydro-gel was used to produce a first separator and a second separator each having a thickness of 200 μm in the same manner as in Example 1 and then, an evaluation unit cell was fabricated in the same manner as in Example 1.

Example 3

A hydro-gel was obtained in the same manner as in Example 1 except that a vinylcarboxylic acid represented by the above formula (I) in which $R^1=(CH_2)_3$ was used in place of the above vinyl acetate. The obtained hydro-gel was used to produce a first separator and a second separator each having a thickness of 200 μm in the same manner as in Example 1 and then, an evaluation unit cell was fabricated in the same manner as in Example 1.

Example 4

A hydro-gel was obtained in the same manner as in Example 1 except that a vinylcarboxylic acid represented by the above formula (I) in which $R^1=(CH_2)_5$ was used in place of the above vinyl acetate. The obtained hydro-gel was used to produce a first separator and a second separator each having a thickness of 200 μm in the same manner as in Example 1 and then, an evaluation unit cell was fabricated in the same manner as in Example 1.

Example 5

A hydro-gel was obtained in the same manner as in Example 1 except that a vinylcarboxylic acid represented by the above formula (I) in which $R^1=(CH_2)_{10}$ was used in place of the above vinyl acetate. The obtained hydro-gel was used to produce a first separator and a second separator each having a thickness of 200 μm in the same manner as in Example 1 and then, an evaluation unit cell was fabricated in the same manner as in Example 1.

Example 6

A hydro-gel was obtained in the same manner as in Example 1 except that a vinylcarboxylic acid represented by the above formula (I) in which $R^1=(CH_2)_{15}$ was used in place of the above vinyl acetate. The obtained hydro-gel was used to produce a first separator and a second separator each having a thickness of 200 μm in the same manner as in Example 1 and then, an evaluation unit cell was fabricated in the same manner as in Example 1.

The results of the IR identification of each hydro-gel (copolymer) obtained in Examples 1 to 6 are shown in the following Table 1. $R_1$, $R_2$, l, m and n of each hydro-gel in the formula (I) are also shown in Table 1.

TABLE 1

| | IR (cm−1) | $R^1$ | $R^2$ | l | m | n |
|---|---|---|---|---|---|---|
| Example 1 | 723, 954, 1622, 1650, 1690, 1730, 1740, 2946, 3045, 3060, 3340, 3567 | $CH_2$ | Aromatic group having structural formula (A) | 50 | 150 | 50 |
| Example 2 | 723, 954, 1623, 1650, 1690, 1730, 1740, 2946, 3068, 3089, 3320, 3645 | $CH_2H_2$ | Aromatic group having structural formula (A) | 100 | 200 | 80 |
| Example 3 | 723, 954, 1633, 1650, 1690, 1730, 1740, 2947, 3046, 3092, 3356, 3568 | $(CH_2)_3$ | Aromatic group having structural formula (A) | 150 | 300 | 100 |
| Example 4 | 723, 954, 1638, 1650, 1690, 1730, 1740, 2948, 3078, 3098, 3355, 3640 | $(CH_2)_5$ | Aromatic group having structural formula (A) | 180 | 400 | 120 |
| Example 5 | 723, 954, 1643, 1650, 1690, 1730, 1740, 2949, 3047, 3087, 3348, 3672 | $(CH_2)_{10}$ | Aromatic group having structural formula (A) | 200 | 500 | 150 |
| Example 6 | 723, 954, 1646, 1650, 1690, 1730, 1740, 2950, 3066, 3095, 3356, 3678 | $(CH_2)_{15}$ | Aromatic group having structural formula (A) | 250 | 600 | 200 |

Also, 10 mg of each hydro-gel (copolymer) obtained in Examples 1 to 6 was sealed in a platinum cylinder cell having an inner diameter of 3 mm and an inner height of 4 mm. This cell and a blank cell were set to the sample stage of a DTG-60/60H (trade name, manufactured by Shimadzu Corporation) TG/DTA simultaneous measuring device with a data processor provided with TA-60 WS thermal analysis software. The decomposition initiation temperature of each sample was measured while observing the thermal behavior of the sample when the temperature was raised from ambient temperature to 300° C. at a temperature rise rate of 5° C./min.

The results are shown in the following Table 2.

TABLE 2

| | Decomposition initiation temperature (° C.) |
|---|---|
| Example 1 | 120 |
| Example 2 | 125 |
| Example 3 | 130 |
| Example 4 | 135 |
| Example 5 | 140 |
| Example 6 | 145 |

As is clear from Table 2, the decomposition initiation temperature of each hydro-gel obtained in Examples 1 to 6 was 120° C., showing unusually high heat resistance for polymers of this kind.

Comparative Example 1

Using two carbon plates, a first separator and a second separator having a serpentine passage structure were respectively produced by cutting processing. Using the obtained first and second separators, an evaluation unit cell was fabricated in the same manner as in Example 1.

[Evaluation of a Unit Cell]

In each unit cell obtained in Examples 1 to 6 and Comparative Example 1, an aqueous 3-wt % methanol solution (fuel) was fed to the anode side at a flow rate of 5 mL/min and air was fed to the cathode side at a rate of 10 mL/min. The current-voltage characteristic of each unit cell was measured at 50° C. The results are shown in FIG. 2.

As is clear from FIG. 2, it is found that a higher output voltage can be drawn from each of the unit cells of Examples 1 to 6 than from the unit cell of Comparative Example 1.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A direct methanol fuel cell comprising:
an anode to which an aqueous methanol solution is supplied as the fuel, a cathode to which oxidizing gas is supplied, an electrolyte membrane interposed between the anode and the cathode, a first separator disposed on the surface of the anode on the side opposite to the electrolyte membrane side and a second separator disposed on the surface of the cathode on the side opposite to the electrolyte membrane side,
wherein the first and second separators are respectively made of a membrane containing a copolymer which is represented by the formula (I) below, and a carbon powder dispersed in the copolymer:

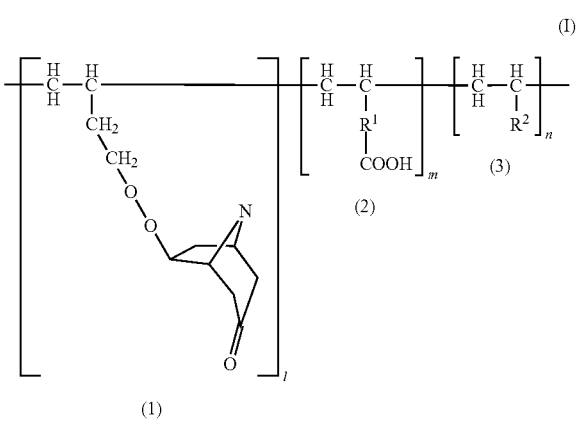

wherein (i) $R^1$ represents an alkyl group having 1 to 20 carbon atoms, (ii) $R^2$ represents an aromatic group, and (iii) l, m and n denote the degrees of polymerization of the first, second and third monomers (1), (2) and (3), respectively: $l=10\text{-}300$, $m=150\text{-}600$ and $n=50\text{-}200$.

2. The fuel cell of claim 1, wherein the aromatic group which is $R^2$ in the formula (I) has the following structural formula (A):

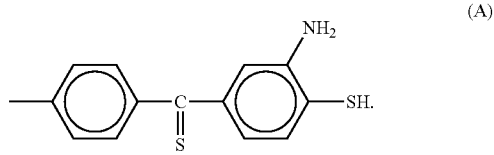

3. The fuel cell of claim 1, wherein the carbon powder has an average particle diameter of 3 to 300 μm.

4. The fuel cell of claim 1, wherein the first and second separators further contain an electrolyte material.

* * * * *